United States Patent
Tanaka et al.

(10) Patent No.: US 12,455,442 B2
(45) Date of Patent: *Oct. 28, 2025

(54) WAVELENGTH VARIABLE OPTICAL FILTER

(71) Applicant: NTT, Inc., Tokyo (JP)

(72) Inventors: Yurina Tanaka, Tokyo (JP); Yuichi Akage, Tokyo (JP); Masahiro Ueno, Tokyo (JP); Takashi Sakamoto, Tokyo (JP); Sohan Kawamura, Tokyo (JP); Soichi Oka, Tokyo (JP)

(73) Assignee: NTT, Inc., Tokyo (JP)

(\*) Notice: Subject to any disclaimer, the term of this patent is extended or adjusted under 35 U.S.C. 154(b) by 347 days.

This patent is subject to a terminal disclaimer.

(21) Appl. No.: 17/919,959

(22) PCT Filed: Apr. 21, 2020

(86) PCT No.: PCT/JP2020/017176
§ 371 (c)(1),
(2) Date: Oct. 19, 2022

(87) PCT Pub. No.: WO2021/214865
PCT Pub. Date: Oct. 28, 2021

(65) Prior Publication Data
US 2023/0161149 A1    May 25, 2023

(51) Int. Cl.
*G02B 26/00* (2006.01)

(52) U.S. Cl.
CPC ....... *G02B 26/002* (2013.01); *G02B 26/001* (2013.01); *G02B 26/007* (2013.01)

(58) Field of Classification Search
CPC .. G02B 26/002; G02B 26/001; G02B 26/007; G02B 26/00; G02F 1/03
See application file for complete search history.

(56) References Cited

U.S. PATENT DOCUMENTS

2024/0319419 A1* 9/2024 Tanaka ............... G02B 5/28

FOREIGN PATENT DOCUMENTS

| JP | 2008145506 A | 6/2008 |
| JP | 2017126037 A | 7/2017 |
| JP | 2018085416 A | 5/2018 |

\* cited by examiner

*Primary Examiner* — James C. Jones
(74) *Attorney, Agent, or Firm* — Slater Matsil, LLP

(57) ABSTRACT

A first component having a plate shape includes a first incident surface and a first emission surface disposed on the opposite side of the first incident surface. The first component is made of light transmissive material having an electrostrictive effect. The first component further includes a first transparent electrode formed on the first incident surface, and a second transparent electrode formed between the first emission surface and a first reflective film.

18 Claims, 2 Drawing Sheets

WAVELENGTH VARIABLE OPTICAL FILTER

CROSS-REFERENCE TO RELATED APPLICATIONS

This application is a national phase entry of PCT Application No. PCT/JP2020/017176, filed on Apr. 21, 2020, which application is hereby incorporated herein by reference.

TECHNICAL FIELD

The present invention relates to a wavelength variable optical filter of Fabry-Perot interferometer type.

BACKGROUND

Wavelength division multiplexing (WDM) is one of the technologies for achieving high-capacity transmission in optical communication. The wavelength division multiplexing includes a plurality of optical signals each having a different wavelength, a multiplexer for multiplexing the plurality of optical signals, an optical fiber for long-distance transmission, a demultiplexer including a wavelength variable optical filter for demultiplexing multiplexed optical signals (separating wavelengths), and an optical receiver for photoelectrically converting (receiving) demultiplexed optical signals. The use of a plurality of wavelengths allows the increase in communication capacity.

In the wavelength division multiplexing, the demultiplexer needs to finely demultiplex a plurality of wavelengths on the order of sub-nm. Further, speeding up the demultiplexer is expected to further increase in the capacity. In addition, a wavelength variable optical filter is required not only for communication applications but also for controlling laser oscillation wavelengths and the like.

In the past, wavelength variable optical filters of diffraction grating type or acousto-optic type have been proposed. Because a wavelength width that can be resolved by these existing wavelength variable optical filters is as large as the order of nm, a filter of Fabry-Perot interferometer type capable of more finely resolving wavelengths has been proposed.

Although a wavelength variable optical filter of Fabry-Perot interferometer type changes wavelengths to be extracted by changing a length between two partial reflective surfaces, the filter mechanically changes the length between two partial reflective surfaces, thus limiting an operating speed to the order of kHz. To solve this issue, a wavelength variable optical filter using KTN crystal has been also proposed (see PTL 1). Application of an electric field to KTN crystal enables crystal strain depending on the magnitude of the electric field to be obtained. Using KTN crystal having such an electrostrictive effect allows for changing a length between two partial reflective surfaces.

CITATION LIST

Patent Literature

Patent Literature 1: JP 2017-126037 A.

SUMMARY

Technical Problem

The wavelength variable optical filter of Fabry-Perot interferometer type described above utilizes the fact that crystal to which an electric field is applied causes strain (electrostrictive effect). Making an interferometer using KTN crystal having this effect enables the length between two partial reflective surfaces to be changed at high speed, and the interferometer can function as a wavelength variable optical filter. To apply an electric field to the crystal, electrodes are placed on the crystal and a voltage is applied from outside. Because the electric field is defined by a drive voltage divided by an interelectrode distance, it is important that the interelectrode distance is short for operation at a low drive voltage.

An existing wavelength variable optical filter, an electrode is formed on each of two mutually-parallel surfaces sandwiching an optical axis passing through a partial reflective surface formed on the emission surface of the KTN crystal. Here, in order for a target light beam to pass through (penetrate) the KTN crystal, the size of the partial reflective surface needs to be greater than the beam diameter. Thus, the interval between the two mutually-parallel surfaces of the KTN crystal sandwiching the optical axis is greater than the beam diameter. That is, the interval between the two electrodes described above is greater than the beam diameter.

It is important that the interelectrode distance is short for operation at a low drive voltage as described above, and it is thus important to reduce the beam diameter of the light propagating inside the wavelength variable optical filter of Fabry-Perot interferometer type. However, when a light beam is formed using a commonly available optical system, the beam diameter is limited to a few mm at the minimum.

For example, when applying an electric field of 400 V/mm causes a strain of 200 nm, a required drive voltage is 200 V with an interelectrode distance of 0.5 mm. In contrast, when using light having a beam diameter of 3 mm, the interelectrode distance is widen to 3 mm, and a drive voltage of 1200 V is required to obtain the same strain amount as described above. Necessity for a high drive voltage causes a system to be expensive as well as complicated.

The present disclosure is contrived to solve the above-described problem, and an object thereof is to allow a wavelength variable optical filter of Fabry-Perot interferometer type to operate at a lower drive voltage.

Means for Solving the Problem

A wavelength variable optical filter according to the present disclosure includes a first plate-like component made of light transmissive material through which light is transmitted and which has having an electrostrictive effect, the first plate-like component including a first incident surface on a side thereof and a first emission surface on the opposite side thereof, the first incident surface and the first emission surface being disposed on an optical axis, a second plate-like component made of light transmissive material, the second component including a second incident surface on a side thereof and a second emission surface on the opposite side thereof, the second incident surface and the second emission surface being disposed on the optical axis, a distance between the first incident surface and the second incident surface on the optical axis being constant, a first reflective film that is formed on the first emission surface and partially reflects light, a first transparent electrode formed on the first incident surface;

a second transparent electrode formed between the first emission surface and the first reflective film; and a second reflective film that is formed on the second incident surface and partially reflects light.

The first reflective film and the second reflective film form a Fabry-Perot interferometer.

Effects of Embodiments of the Invention

As described above, the present disclosure forms the first transparent electrode on the first incident surface of the first plate-like component and the second transparent electrode on the first emission surface, thus enabling the wavelength variable optical filter of Fabry-Perot interferometer type to be driven at a lower drive voltage.

DETAILED DESCRIPTION OF ILLUSTRATIVE EMBODIMENTS

Figure 1:
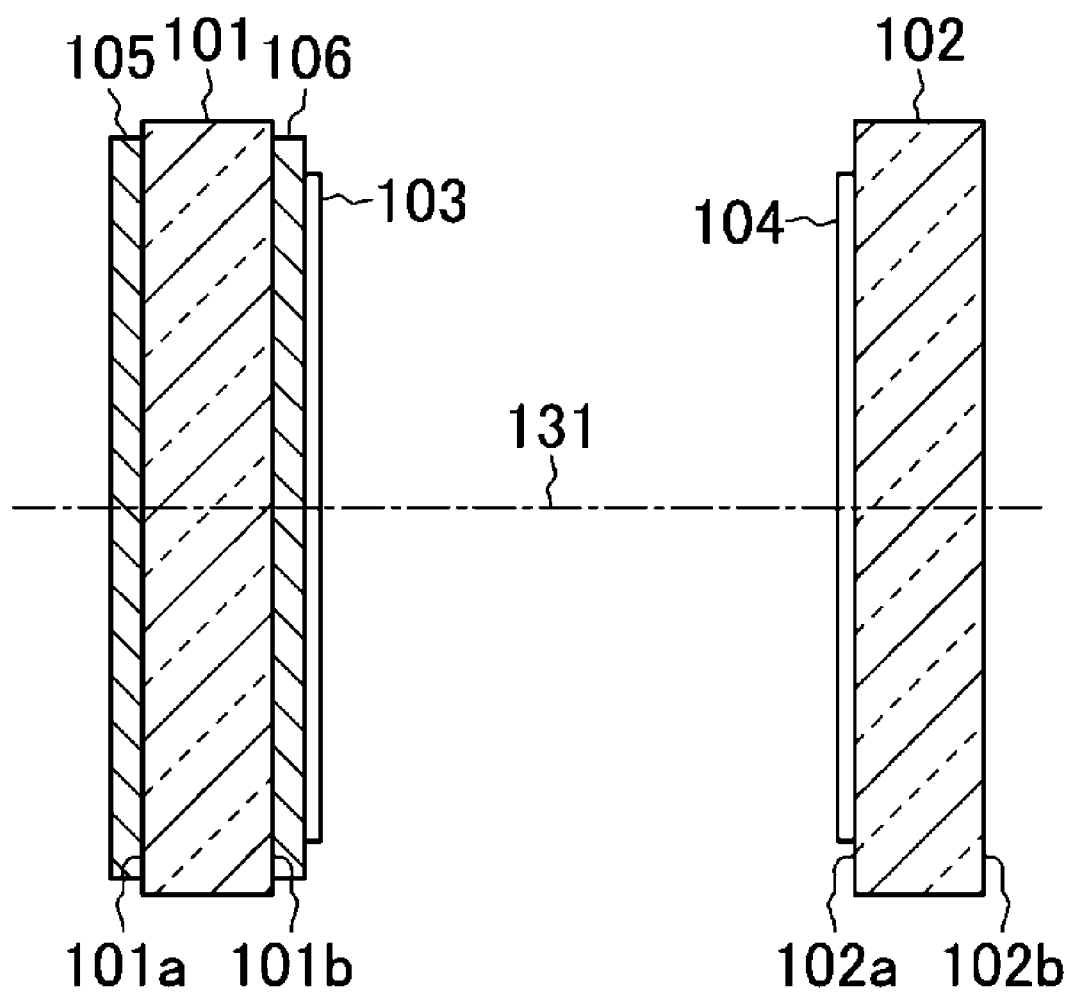
FIG. 1 is a cross-sectional view illustrating a configuration of a wavelength variable optical filter according to an embodiment of the present disclosure.
Figure 2:
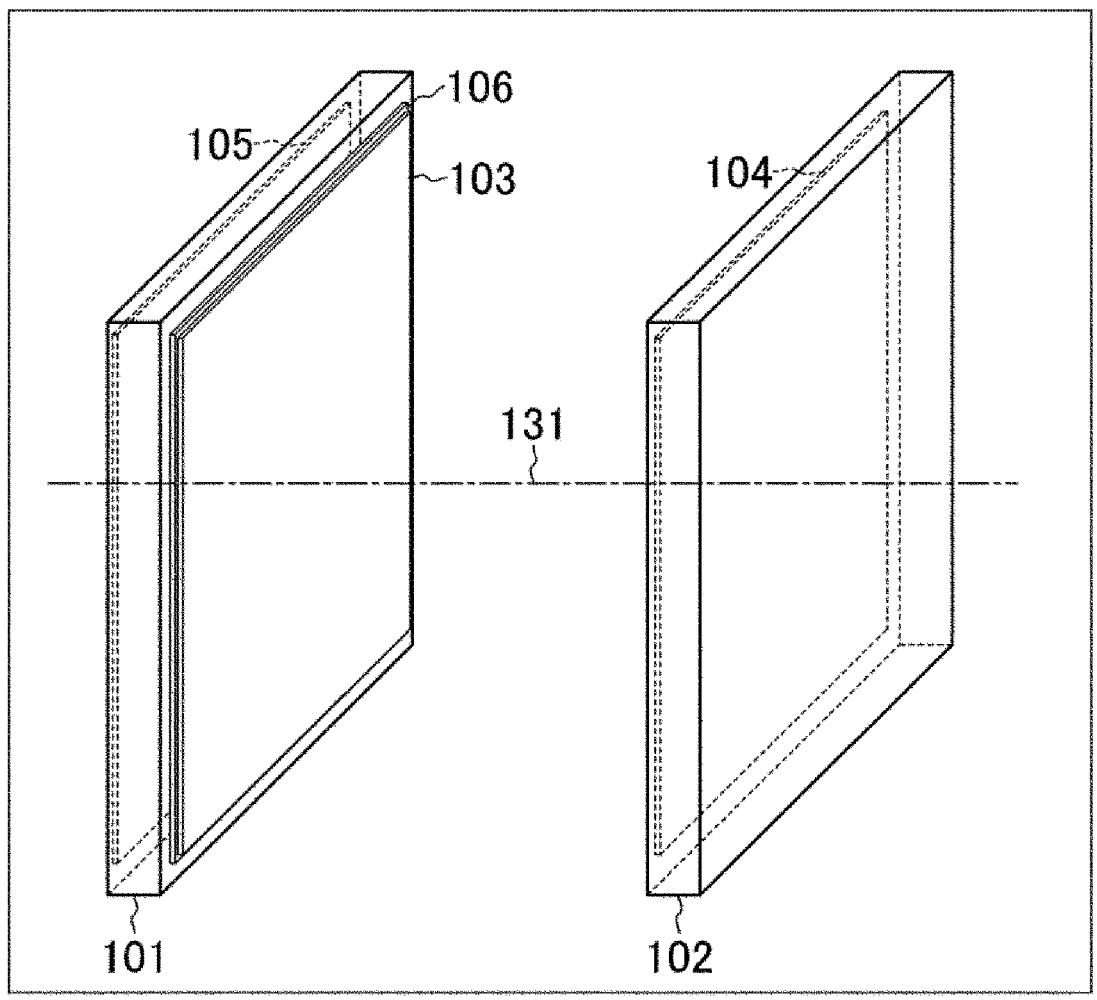
FIG. 2 is a perspective view illustrating a configuration of a wavelength variable optical filter according to an embodiment of the present disclosure.

Hereinafter, a wavelength variable optical filter according to an embodiment of the present disclosure will be described with reference to FIGS. 1 and 2. The wavelength variable optical filter includes a first component 101 having a plate shape, a second component 102 having a plate shape, a first reflective film 103, a second reflective film 104, a first transparent electrode 105, and a second transparent electrode 106.

The first component 101 includes a first incident surface 101a and a first emission surface 101b disposed on the opposite side of the first incident surface 101a. The first component 101 is made of light transmissive material which has an electrostrictive effect. The first component 101 can be made of, for example, piezoelectric crystal having an electrostrictive effect. The first component 101 is made of material having high transparency to light in target wavelength bands.

The first component 101 can be made of, for example, either of KTN [$KTa_{1-\alpha}Nb_{\alpha}O_3$ ($0<\alpha<1$)] crystal or KLTN [$K_{1-\beta}Li_{\beta}Ta_{1-\alpha}Nb_{\alpha}O_3$ ($0<\alpha<1$, $0<\beta<1$)] crystal with lithium being added. KTN crystals and KLTN crystals are known as crystals having an electrostrictive effect. The electrostrictive effect of these crystals is known to be able to cause a strain amount proportional to the square of an electric field defined by voltage/interelectrode distance. Alternatively, the first component 101 may be made of barium titanate ($BaTiO_3$), lithium niobate ($LiNbO_3$), calcium fluoride ($CaF_2$), and the like. In the first component 101, it is important that the surface accuracy (maximum shape error) of the first incident surface 101a and the first emission surface 101b is about one tenth of a target light wavelength.

The second component 102 includes a second incident surface 102a and a second emission surface 102b disposed on the opposite side of the second incident surface 102a. The second component 102 is made of light transmissive material. The second component 102 can be made of material having high transparency to light in target wavelength bands. The second component 102 can be formed of, for example, $BK_7$ glass or quartz glass. Further, the second component 102 can be also made of, for example, either of KTN [$KTa_{1-\alpha}Nb_{\alpha}O_3$ ($0<\alpha<1$)] crystal or KLTN [$K_{1-\beta}Li_{\beta}Ta_{1-\alpha}Nb_{\alpha}O_3$ ($0<\alpha<1$, $0<\beta<1$)] crystal with lithium being added. Alternatively, the second component 102 may be made of barium titanate ($BaTiO_3$), lithium niobate ($LiNbO_3$), calcium fluoride ($CaF_2$), and the like. In the second component 102, it is important that the surface accuracy (maximum shape error) of the second incident surface 102a and the second emission surface 102b is about one tenth of a target light wavelength.

The first incident surface 101a and the first emission surface 101b of the first component 101 are disposed on an optical axis (light path) 131, and the second incident surface 102a and the second emission surface 102b of the second component 102 are also disposed on the optical axis 131. In addition, the distance between the first incident surface 101a and the second incident surface 102a is constant on the optical axis 131. For example, when the first component 101 and the second component 102 are fixedly disposed on a surface plate (not illustrated), the distance between the first incident surface 101a and the second incident surface 102a can be fixed on the optical axis 131.

Further, the wavelength variable optical filter according to an embodiment includes a first reflective film 103 formed on the first emission surface 101b and partially reflecting light, and a second reflective film 104 formed on the second entrance 102a and partially reflecting light. The first reflective film 103 and the second reflective film 104 constitute a Fabry-Perot interferometer.

Here, the first emission surface 101b and the second incident surface 102a can be disposed so as to face each other and to be parallel to each other. The first incident surface 101a and the first emission surface 101b can be parallel to each other. Similarly, the second incident surface 102a and the second emission surface 102b can be parallel to each other.

Note that, when a reflective optical system or the like is disposed between the first emission surface 101b and the second incident surface 102a to bend the optical axis 131 in the middle, it is not necessary to dispose the first emission surface 101b and the second incident surface 102a to face each other. For example, the first emission surface 101b and the second incident surface 102a can be surfaces perpendicular to the optical axis 131. Here, the positional relationship between the first emission surface 101b and the second incident surface 102a described above is the same as the relationship between the reflective surfaces of the first reflective film 103 and the second reflective film 104.

Further, the wavelength variable optical filter according to an embodiment includes the first transparent electrode 105 formed on the first incident surface 101a, and the second transparent electrode 106 formed between the first emission surface 101b and the first reflective film 103. The first transparent electrode 105 and the second transparent electrode 106 can be made of, for example, indium tin oxide (ITO). The distance between the first transparent electrode 105 and the second transparent electrode 106, that is, the plate thickness of the first component 101 is smaller than the beam diameter of light.

In the wavelength variable optical filter according to an embodiment, for example, the distance (interval) between the first transparent electrode 105 and the second transparent electrode 106 can be 0.1 mm, the distance (distance on the optical axis) between the reflective surface of the first reflective film 103 and the reflective surface of the second reflective film 104 can be 10 μm, and the reflectance of the first reflective film 103 and the second reflective film 104 can be 99.5%. With this configuration, applying a voltage of 120 V between the first transparent electrode 105 and the second transparent electrode 106 can cause a strain amount of 700 nm in the first component 101. The distance (distance on the optical axis) between the reflective surface of the first reflective film 103 and the reflective surface of the second reflective film 104 changes depending on the change in the strain amount. The change described above allow the wavelength variable optical filter of Fabry-Perot interferometer type according to an embodiment to have a filter width of 0.2 nm with respect to wavelengths in 1550 nm band, allowing a 100 nm wavelength sweep.

According to an embodiment, the second transparent electrode 106 and the first reflective film 103 are disposed on the first emission surface 101b of the first component 101. Thus, the distance between the first transparent electrode 105 and the second transparent electrode 106 is determined by the plate thickness of the first component 101 without depending on the areas of the first incident surface 101a and the first emission surface 101b through which the beam of light is transmitted. In this way, according to an embodiment, by using the transparent electrode, the reflective surface is substantially identical to the surface of the electrode, and thus the distance between the electrodes is not limited by the beam diameter. According to an embodiment, the distance between the electrodes can be designed to be short and a required drive voltage can be reduced.

By the way, for example, when light is transmitted through the first component 101 made of KTN crystal or KLTN crystal, the characteristics of the light such as a light path and a polarization state may change. For this reason, it is desirable that the distance (plate thickness) over which the light is transmitted through the first component 101 is short (thin). When the thickness in a light transmission direction of a part on which electrode is provided is reduced, the installation area of the electrode is also reduced, causing difficulty in installing the electrode. In the related art, for example, when a thickness in a light transmission direction is 0.1 mm, an electrode cannot be installed and operation as a wavelength variable optical filter is difficult.

In contrast, according to the present disclosure, even when the thickness (plate thickness) of the first component 101 in a light transmission direction is reduced and the transmission length of light is shortened, the area of the surface on which the electrode is formed is not changed. Thus, according to the present disclosure, it is possible to perform an operation at low voltage with less influence on the characteristics of light. Here, as is well known, KTN crystal and KLTN crystal cause the largest strain amount in a same direction as an electric field direction. According to the present disclosure, the direction in which the first component 101 is desired to be distorted (elongated or contracted) is the direction of the optical axis 131, that is, the plate thickness direction of the first component 101, and the electric field direction and the direction of strain coincide with each other. In this regard as well, according to the present disclosure, a required amount of strain in the first component 101 can be obtained at a lower voltage.

As described above, according to the present disclosure, because the first transparent electrode is formed on the first incident surface and the second transparent electrode is formed on the first emission surface of the first component having a plate shape, the wavelength variable optical filter of Fabry-Perot interferometer type can be driven at a lower drive voltage.

Meanwhile, the present disclosure is not limited to the embodiments described above, and it will be obvious to those skilled in the art that various modifications and combinations can be implemented within the technical idea of the present disclosure.

REFERENCE SIGNS LIST

101 First component
101a First incident surface
101b First emission surface
102 Second component
102a Second incident surface
102b Second emission surface
103 First reflective film
104 Second reflective film
105 First transparent electrode
106 Second transparent electrode
131 Optical axis.

The invention claimed is:

1. A wavelength variable optical filter comprising:
a first plate-like component made of a light transmissive material which has an electrostrictive effect, the first plate-like component including a first incident surface on a first side of the first plate-like component and a first emission surface on a second side of the first plate-like component, the first side of the first plate-like component being opposite to the second side of the first plate-like component;
a second plate-like component made of a light transmissive material, the second plate-like component including a second incident surface on a first side of the second plate-like component and a second emission surface on a second side of the second plate-like component, the first side of the second plate-like component being opposite to the second side of the second plate-like component;
a first reflective film on a side of the first emission surface and configured to partially reflect light transmitting through the first plate-like component;
a first transparent electrode on the first incident surface;
a second transparent electrode between the first emission surface and the first reflective film; and
a second reflective film on the second incident surface and configured to partially reflect light transmitting through the second plate-like component, wherein the first reflective film and the second reflective film provide a Fabry-Perot interferometer.

2. The wavelength variable optical filter according to claim 1, wherein the first emission surface and the second incident surface face each other.

3. The wavelength variable optical filter according to claim 1, wherein the first incident surface and the first emission surface are parallel to each other.

4. The wavelength variable optical filter according to claim 1, wherein the second incident surface and the second emission surface are parallel to each other.

5. The wavelength variable optical filter according to claim 1, wherein a distance between the first transparent electrode and the second transparent electrode is smaller than a beam diameter of the light transmitting through the first plate-like component.

6. The wavelength variable optical filter according to claim 1, wherein the first plate-like component is made of KTN [$KTa_{1-\alpha}Nb_\alpha O_3$ ($0<\alpha<1$)] crystal or KLTN [$K_{1-\beta}Li_\beta Ta_{1-\alpha}Nb_\alpha O_3$ ($0<\alpha<1$, $0<\beta<1$)] crystal with lithium added.

7. The wavelength variable optical filter according to claim 1, wherein the second plate-like component is made of KTN [$KTa_{1-\alpha}Nb_\alpha O_3$ ($0<\alpha<1$)] crystal or KLTN [$K_{1-\beta}Li_\beta Ta_{1-\alpha}Nb_\alpha O_3$ ($0<\alpha<1$, $0<\beta<1$)] crystal with lithium added.

8. The wavelength variable optical filter according to claim 1, wherein the first transparent electrode and the second transparent electrode are made of indium tin oxide.

9. The wavelength variable optical filter according to claim 1, wherein:
the first incident surface, the first emission surface, the second incident surface and the second emission surface are disposed on an optical axis; and
a distance between the first incident surface and the second incident surface on the optical axis is constant.

10. A method of making a wavelength variable optical filter, the method comprising:
providing a first plate-like component made of a light transmissive material which has an electrostrictive effect, the first plate-like component including a first incident surface on a first side of the first plate-like component and a first emission surface on a second side of the first plate-like component, the first side of the first plate-like component being opposite to the second side of the first plate-like component;
providing a second plate-like component made of a light transmissive material, the second plate-like component including a second incident surface on a first side of the second plate-like component and a second emission surface on a second side of the second plate-like component, the first side of the second plate-like component being opposite to the second side of the second plate-like component;
forming a first reflective film on a side of the first emission surface, the first reflective film being configured to partially reflect light transmitting through the first plate-like component;
forming a first transparent electrode on the first incident surface;
forming a second transparent electrode between the first emission surface and the first reflective film; and
forming a second reflective film on the second incident surface, the second reflective film being configured to partially reflect light transmitting through the second plate-like component, wherein the first reflective film and the second reflective film make a Fabry-Perot interferometer.

11. The method according to claim 10, wherein the first emission surface and the second incident surface face each other.

12. The method according to claim 10, wherein the first incident surface and the first emission surface are parallel to each other.

13. The method according to claim 10, wherein the second incident surface and the second emission surface are parallel to each other.

14. The method according to claim 10, wherein a distance between the first transparent electrode and the second transparent electrode is smaller than a beam diameter of the light transmitting through the first plate-like component.

15. The method according to claim 10, wherein the first plate-like component is made of KTN [$KTa_{1-\alpha}Nb_{\alpha}O_3$ ($0<\alpha<1$)] crystal or KLTN [$K_{1-\beta}Li_{\beta}Ta_{1-\alpha}Nb_{\alpha}O_3$ ($0<\alpha<1$, $0<\beta<1$)] crystal with lithium added.

16. The method according to claim 10, wherein the second plate-like component is made of KTN [$KTa_{1-\alpha}Nb_{\alpha}O_3$ ($0<\alpha<1$)] crystal or KLTN [$K_{1-\beta}Li_{\beta}Ta_{1-\alpha}Nb_{\alpha}O_3$ ($0<\alpha<1$, $0<\beta<1$)] crystal with lithium added.

17. The method according to claim 10, wherein the first transparent electrode and the second transparent electrode are made of indium tin oxide.

18. The method according to claim 10, wherein:
the first incident surface, the first emission surface, the second incident surface and the second emission surface are disposed on an optical axis; and
a distance between the first incident surface and the second incident surface on the optical axis is constant.

* * * * *